US010924646B2

(12) United States Patent
Kondo

(10) Patent No.: US 10,924,646 B2
(45) Date of Patent: Feb. 16, 2021

(54) CAMERA SYSTEM, LENS UNIT, AND CAMERA BODY

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/364,191

(22) Filed: Mar. 26, 2019

(65) Prior Publication Data

US 2019/0222730 A1    Jul. 18, 2019

Related U.S. Application Data

(63) Continuation of application No. PCT/JP2017/034806, filed on Sep. 26, 2017.

(30) Foreign Application Priority Data

Sep. 27, 2016  (JP) .................................. 2016-188702

(51) Int. Cl.
| | |
|---|---|
| *H04N 5/225* | (2006.01) |
| *G03B 17/14* | (2006.01) |
| *G03B 17/12* | (2021.01) |

(52) U.S. Cl.
CPC ........... *H04N 5/2254* (2013.01); *G03B 17/12* (2013.01); *G03B 17/14* (2013.01); *H04N 5/2252* (2013.01)

(58) Field of Classification Search
CPC ..................................................... G03B 17/14
See application file for complete search history.

(56) References Cited

U.S. PATENT DOCUMENTS

| | | | | |
|---|---|---|---|---|
| 3,758,198 A | * | 9/1973 | Kanie | .................... G03B 17/12 |
| | | | | 359/828 |
| 4,062,030 A | * | 12/1977 | Starp | ..................... G03B 17/14 |
| | | | | 396/531 |

(Continued)

FOREIGN PATENT DOCUMENTS

| | | |
|---|---|---|
| JP | S55147620 | 11/1980 |
| JP | H0460622 | 2/1992 |

(Continued)

OTHER PUBLICATIONS

"International Search Report (Form PCT/ISA/210) of PCT/JP2017/034806," dated Dec. 26, 2017, with English translation thereof, pp. 1-4.

(Continued)

*Primary Examiner* — Clayton E. LaBalle
*Assistant Examiner* — Leon W Rhodes, Jr.
(74) *Attorney, Agent, or Firm* — JCIPRNET

(57) ABSTRACT

There are provided a camera system, a lens unit, and a camera body that can improve feeling and sound to be given to an operator at the time of mounting of the lens unit and the time of operation of the lens unit. A camera system includes a lens unit that includes a lens mount and a camera body that includes a body mount. The lens mount includes a lens-reference surface that is to be in contact with the body mount, a cylindrical portion that extends toward the body mount from the lens-reference surface, and a plurality of bayonet claws that are provided in a circumferential direction of the cylindrical portion and extend outward in a radial direction. The body mount includes a body-reference surface that is to be in contact with the lens-reference surface, a body claw that is to be engaged with the bayonet claws, and an elastic member that has a contact surface to be in contact with the cylindrical portion. The elastic member (Continued)

biases the cylindrical portion in the radial direction in a case where the lens unit is mounted on the body mount.

16 Claims, 12 Drawing Sheets

(56) References Cited

U.S. PATENT DOCUMENTS

| | | | | |
|---|---|---|---|---|
| 4,963,902 A * | 10/1990 | Fukahori | ................ | G03B 17/08 |
| | | | | 396/29 |
| 5,262,899 A | 11/1993 | Iizuka | | |
| 5,644,441 A * | 7/1997 | Hirasaki | ................ | G02B 7/022 |
| | | | | 359/827 |
| 6,452,733 B2 * | 9/2002 | Verbiest | ................... | G02B 7/14 |
| | | | | 359/827 |
| 7,924,515 B2 * | 4/2011 | Plangger | .............. | G02B 21/362 |
| | | | | 359/827 |

FOREIGN PATENT DOCUMENTS

| | | |
|---|---|---|
| JP | 2004102005 | 4/2004 |
| JP | 2010066580 | 3/2010 |

OTHER PUBLICATIONS

"Written Opinion of the International Searching Authority (Form PCT/ISA/237) of PCT/JP2017/034806," dated Dec. 26, 2017, with English translation thereof, pp. 1-7.

"Office Action of China Counterpart Application", dated Aug. 26, 2020, with English translation thereof, pp. 1-11.

* cited by examiner

FIG. 1
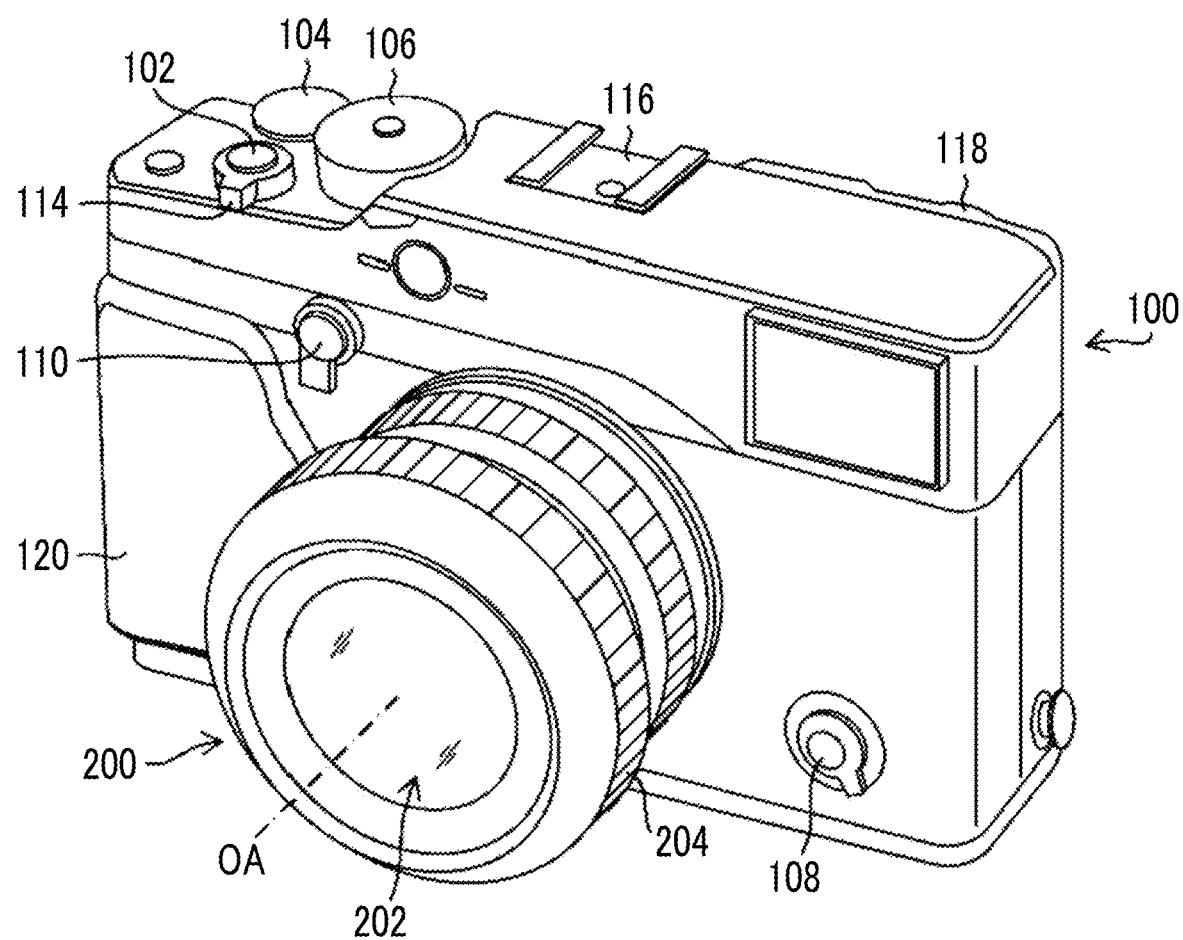
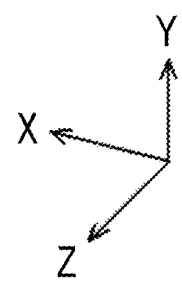

FIG. 2
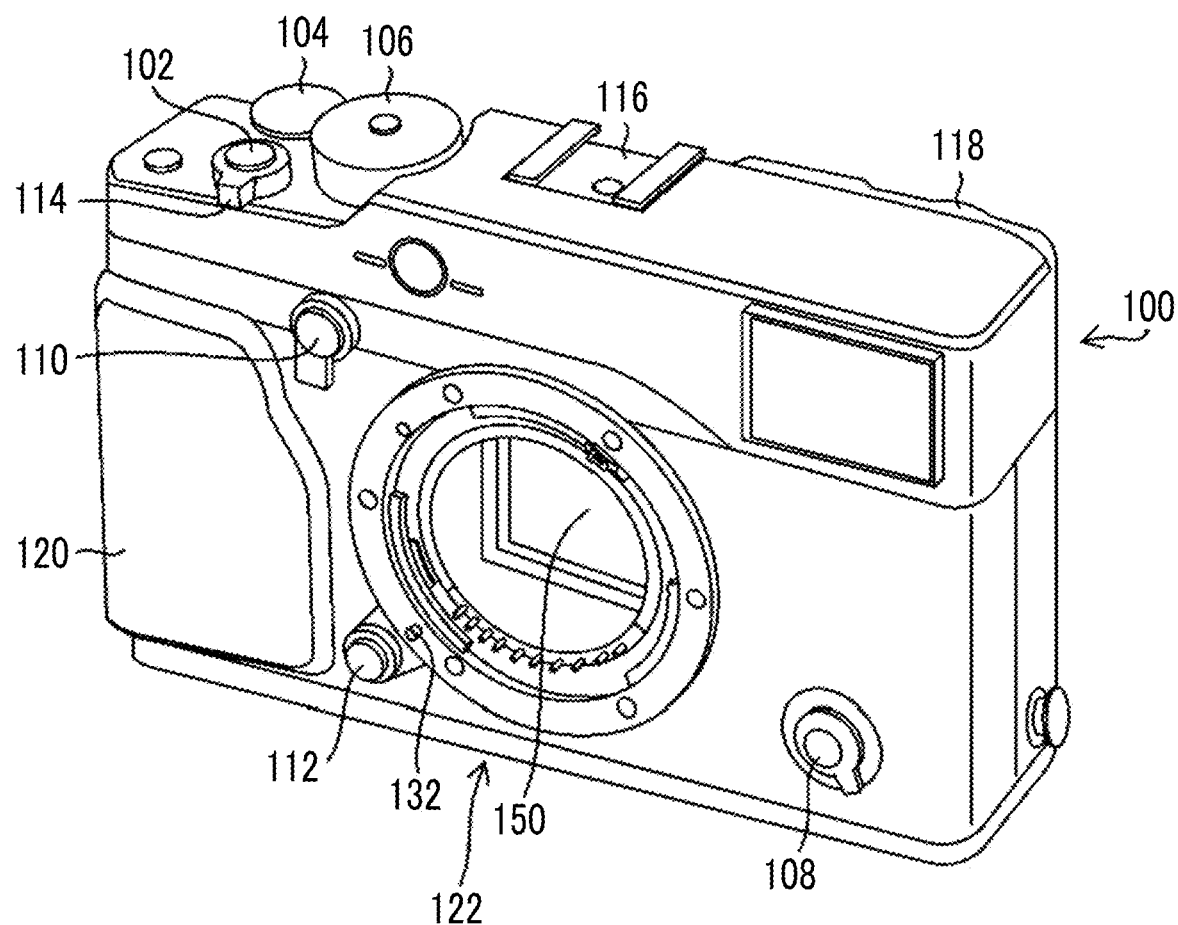
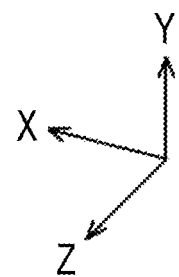

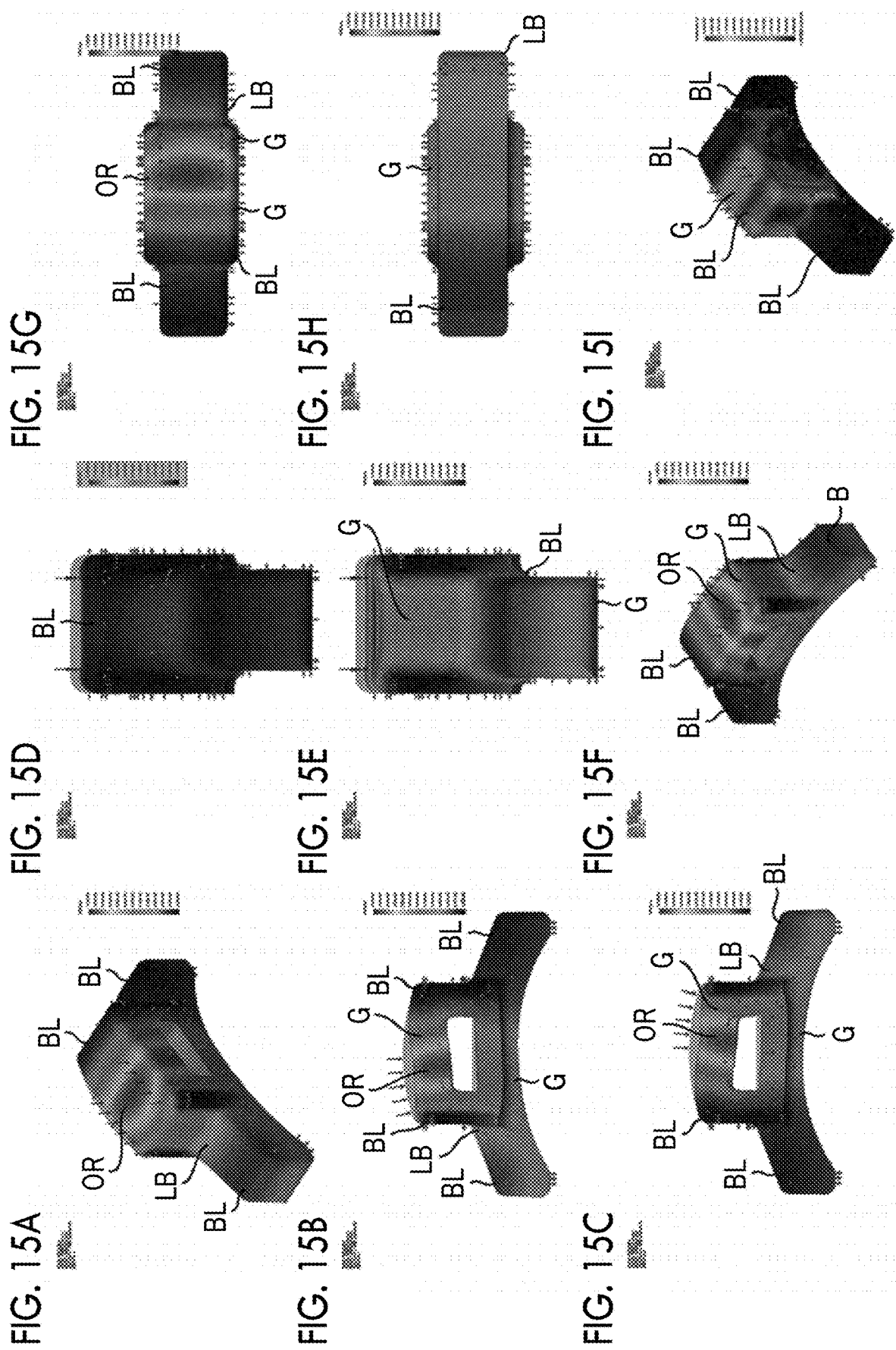

CAMERA SYSTEM, LENS UNIT, AND CAMERA BODY

CROSS-REFERENCE TO RELATED APPLICATIONS

The present application is a Continuation of PCT International Application No. PCT/JP2017/034806 filed on Sep. 26, 2017 claiming priority under 35 U.S.C § 119(a) to Japanese Patent Application No. 2016-188702 filed on Sep. 27, 2016. Each of the above applications is hereby expressly incorporated by reference, in their entirety, into the present application.

BACKGROUND OF THE INVENTION

1. Field of the Invention

The present invention relates to a camera system of which a lens unit is mounted on a camera body in a bayonet manner, the lens unit, and the camera body.

2. Description of the Related Art

In the related art, a structure where a lens unit is mounted on a camera body in a bayonet manner has been widely employed in a camera that is used while a lens unit is interchanged. For example, JP1980-147620A (JP-S55-147620A) discloses a structure that biases a lens unit in the direction of an optical axis and a radial direction by a spring member to absorb backlash occurring in the direction of the optical axis and the radial direction in a case where the lens unit is mounted on a camera body in a bayonet manner.

SUMMARY OF THE INVENTION

Generally, the mounting of the lens unit on the camera body and an operation of a zoom ring and the like relative to the lens unit after the mounting are performed by an operator's manual operation. Accordingly, a biasing force, which is applied in the radial direction by the spring member, is perceived as operator's feeling (referred to as click feeling) or sound at the time of mounting of the lens unit and the time of operation of the lens unit.

In JP1980-147620A (JP-S55-147620A), the mounting position of the spring member, which biases the lens unit in the radial direction, is not examined and there is a concern that discomfort may be given to an operator as feeling or sound at the time of mounting of the lens unit and the time of operation of the lens unit.

The invention has been made in consideration of the above-mentioned circumstances, and an object of the invention is to provide a camera system, a lens unit, and a camera body that can improve feeling and sound to be given to an operator at the time of mounting of the lens unit and the time of operation of the lens unit.

A camera system of a first aspect comprises a lens unit that includes a lens mount and a camera body that includes a body mount; the lens mount includes a lens mount-reference surface that is to be in contact with the body mount, a cylindrical portion that extends toward the body mount from the lens mount-reference surface, and a plurality of bayonet claws that are provided in a circumferential direction of the cylindrical portion and extend outward in a radial direction; the body mount includes a body mount-reference surface that is to be in contact with the lens mount-reference surface, a body claw that is to be engaged with the bayonet claws, and an elastic member that has a contact surface to be in contact with the cylindrical portion; and the elastic member biases the cylindrical portion in the radial direction in a case where the lens unit is mounted on the body mount.

In a camera system of a second aspect, the elastic member is disposed at a position where the elastic member is in contact with the cylindrical portion at a stop position of the body claw.

In a camera system of a third aspect, the elastic member is formed of a molded member and is adapted to generate an elastic force by the entire elastic member.

In a camera system of a fourth aspect, the cylindrical portion includes a thin-wall portion that is not in contact with the elastic member.

In a camera system of a fifth aspect, a plurality of the elastic members are arranged.

In a camera system of a sixth aspect, the elastic member is disposed on the body claw or an extension of the body claw in a circumferential direction.

In a camera system of a seventh aspect, the body mount comprises pull springs that bias the bayonet claws in a direction of an optical axis, and the elastic member is disposed at a position where the elastic member does not interfere with the pull spring in a case where the elastic member is viewed in the direction of the optical axis.

In a camera system of an eighth aspect, the elastic member has a hollow structure.

In a camera system of a ninth aspect, the contact surface of the elastic member protrudes toward the cylindrical portion more than the body claw.

In a camera system of a tenth aspect, the contact surface of the elastic member has the shape of an arc.

In a camera system of an eleventh aspect, a surface of the elastic member opposite to the contact surface has the shape of an arc protruding toward the contact surface.

In a camera system of a twelfth aspect, a front end of the contact surface of the elastic member in a travel direction has the shape of a rounded corner.

A lens unit of a thirteenth aspect includes a lens mount that is to be mounted on a body mount of a camera; the lens mount includes a lens mount-reference surface that is to be in contact with the body mount, a cylindrical portion that extends toward the body mount from the lens mount-reference surface, and a plurality of bayonet claws that are provided in a circumferential direction of the cylindrical portion and extend outward in a radial direction; and the cylindrical portion includes a thin-wall portion that is provided between the adjacent bayonet claws.

A camera body of a fourteenth aspect includes a body mount that is to be mounted on a lens mount of a lens unit; and the body mount includes a body mount-reference surface that is to be in contact with the lens mount, a body claw, and an elastic member that is to be in contact with a cylindrical portion of the lens mount and is to bias the cylindrical portion in a radial direction.

According to the invention, it is possible to improve feeling and sound to be given to an operator at the time of mounting of the lens unit and the time of operation of the lens unit.

BRIEF DESCRIPTION OF THE DRAWINGS

FIG. 1 is a perspective view showing the appearance of a camera system in a state where a lens unit is mounted on a camera body.

FIG. 2 is a perspective view showing the appearance of the camera body.

FIGS. 15A to 15I are diagrams showing the distribution of displacement and stress of the elastic member.

DESCRIPTION OF THE PREFERRED EMBODIMENTS

A preferred embodiment of the invention will be described below with reference to accompanying drawings. The invention will be described using the following preferred embodiment.

The invention can be modified by various methods without departing from the scope of the invention, and embodiments other than the embodiment can be used. Accordingly, all modifications within the scope of the invention are included in the claims.

Figure 3:
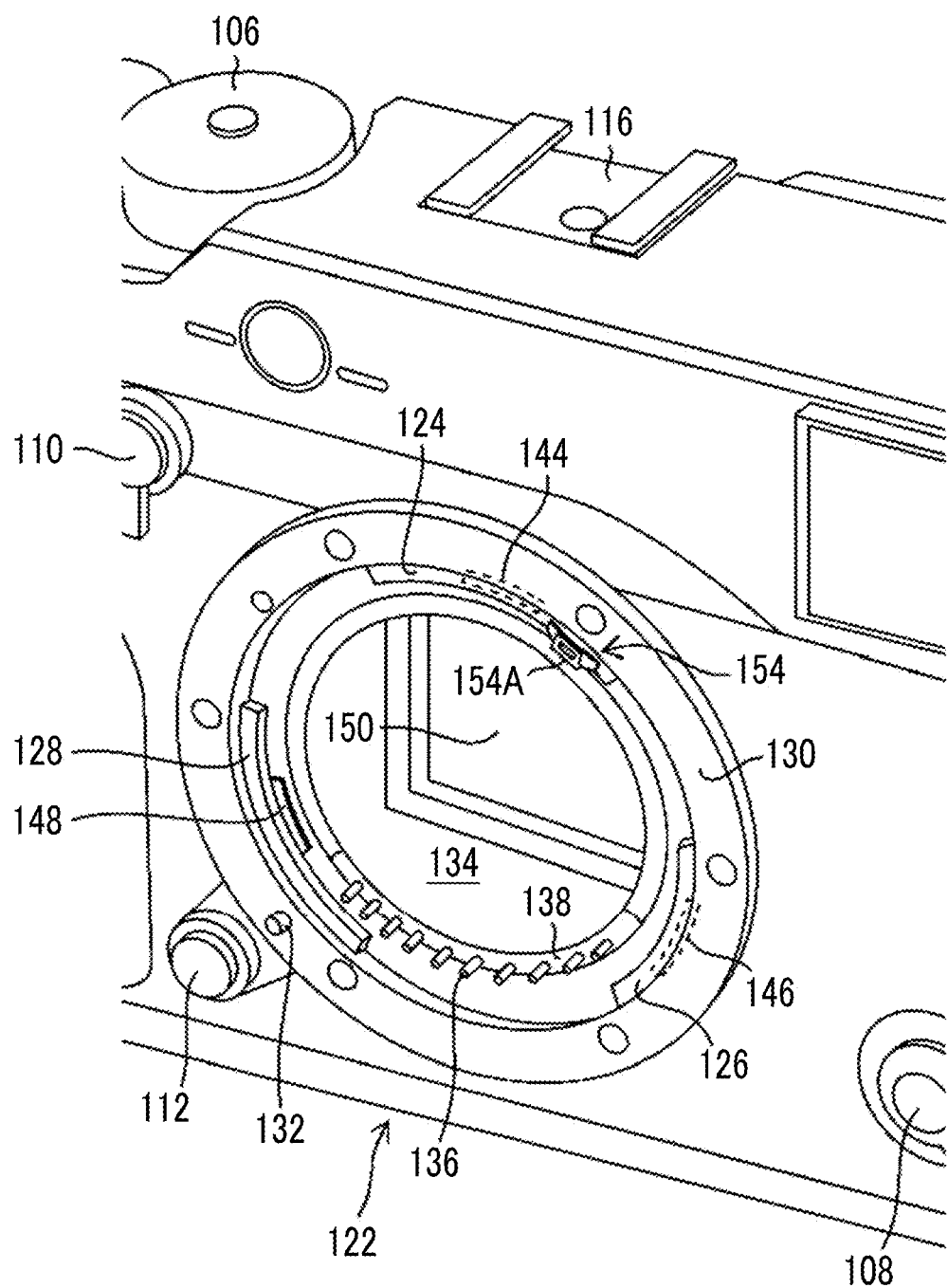
FIG. 3 is an enlarged view of a body mount.
Figure 4:
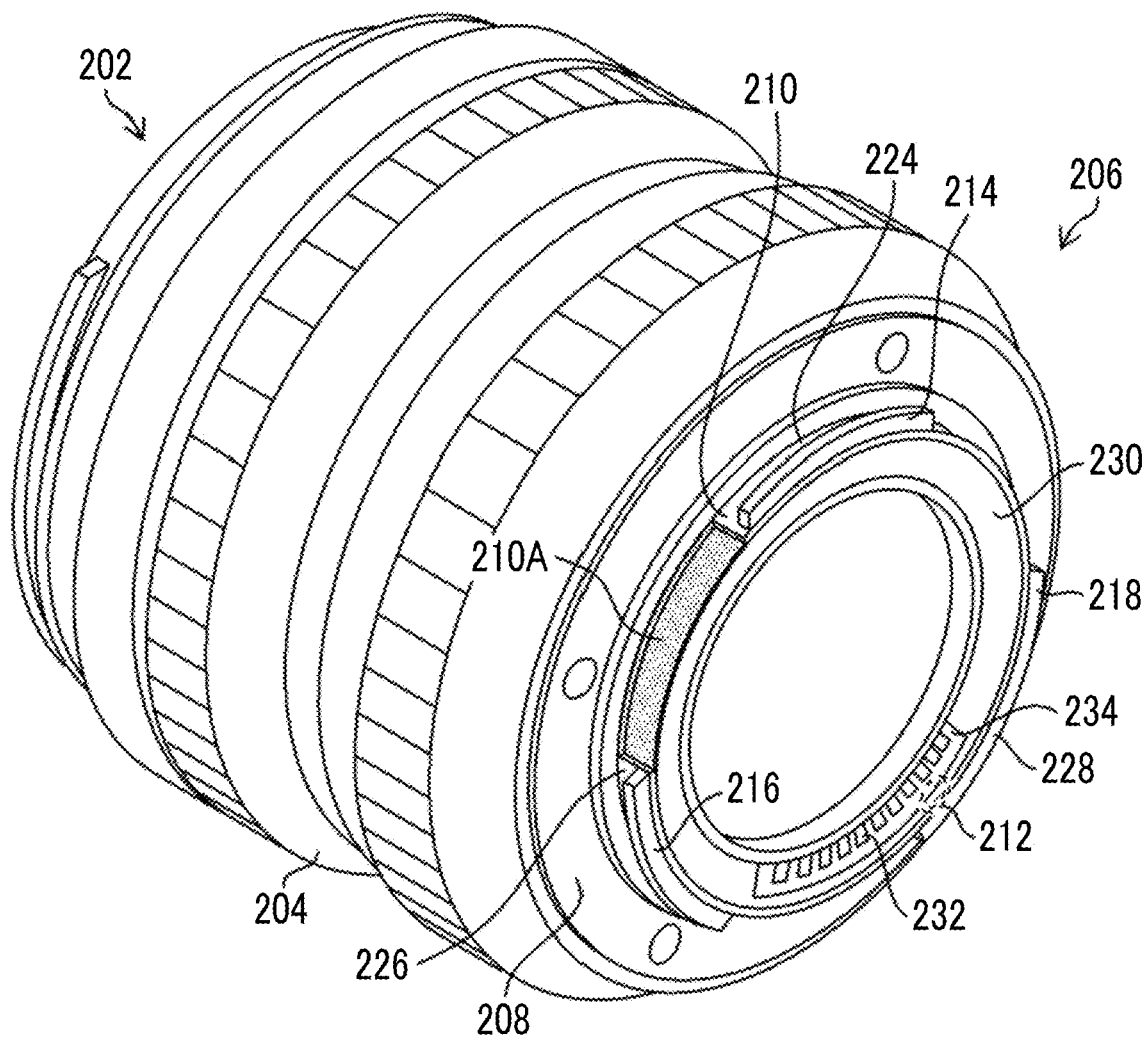
FIG. 4 is a perspective view showing the appearance of the lens unit.

A camera system of this embodiment will be described with reference to the drawings. FIG. 1 is a perspective view showing the appearance of a camera system in which a lens unit is mounted on a camera body, and FIG. 2 is a perspective view showing the appearance of the camera body. FIG. 3 is an enlarged view of a body mount. FIG. 4 is a perspective view showing the appearance of the lens unit.

In this specification, a direction along an optical axis OA (a Z direction in FIGS. 1 and 2) is referred to as a front-rear direction and a subject side is referred to as a front side. Further, in a plane orthogonal to the optical axis OA, a direction (an X direction in FIGS. 1 and 2) along a long side of an image sensor 150 (see FIG. 2) is referred to as a lateral direction or a left-right direction and a direction (a Y direction in FIGS. 1 and 2) along a short side of the image sensor 150 is referred to as a vertical direction or an up-down direction.

As shown in FIG. 1, the camera system 1 includes a camera body 100 and a lens unit 200. The camera system 1 of this embodiment is a lens-interchangeable camera system 1, and the lens unit 200 is attachably and detachably mounted on the camera body 100.

As shown in FIGS. 1 and 2, the camera body 100 has the shape of a rectangular box of which the thickness in the front-rear direction is smaller than the height in the up-down direction. The camera body 100 comprises a shutter button 102, an exposure correction dial 104, a shutter speed dial 106, a focus mode switching lever 108, a finder switching lever 110, a lens attachment/detachment button 112, a power lever 114, and the like as operation members. The shutter button 102, the exposure correction dial 104, and the shutter speed dial 106 are disposed on the upper side of the camera body 100.

The camera body 100 comprises a hot shoe 116, an electronic view finder 118, a grip 120, and a body mount 122. The grip 120 is disposed on the left side of the camera body 100. A user performs a release operation while gripping the grip 120.

The body mount 122 is a mounting portion on which the lens unit 200 is to be mounted. The body mount 122 has a bayonet structure.

As shown in FIG. 1, the lens unit 200 includes an optical system 202 that includes at least one lens and a lens barrel 204 that receives the optical system 202. The optical system 202 including lenses means an assembly of optical members that are used to form the image of an object by allowing the lenses to transmit light.

The lens barrel 204 is a substantially cylindrical body that can receive the optical system 202, and the shape of the lens barrel 204 is not limited as long as the lens barrel 204 can receive the optical system 202. Further, the lens barrel 204 can comprise, for example, a focus ring, a stop ring, and the like, and can form an appropriate image by the adjustment of the focus ring, the stop ring, and the like.

As shown in FIG. 2, the image sensor 150, which is exposed from the body mount 122, is disposed in the camera body 100. The image sensor 150 converts the image of a subject, which is formed by the optical system 202 of the lens unit 200, into electrical signals and outputs the electrical signals. A publicly known image sensor, such as a charge coupled device (CCD) image sensor or a complementary metal oxide semiconductor (CMOS) image sensor, is used as the image sensor 150.

FIG. 3 is an enlarged view of the body mount 122 of the camera body 100. Three body claws 124, 126, and 128 are disposed on the body mount 122 at intervals to mount a lens unit 200 (see FIG. 4) to be described later on the body mount 122. The body mount 122 may include at least one body claw. The size of the interval between the body claws 124, 126, and 128 is set to a size that can allow each of bayonet claws 214, 216, and 218 of the lens mount 206 to pass.

In this embodiment, a body mount ring 130 including an opening 134 is disposed on the front side of the camera body 100. The three body claws 124, 126, and 128 are formed so as to protrude inward from the body mount ring 130 in the radial direction of the opening 134. The three body claws 124, 126, and 128 are arranged so as to be spaced away from each other in the circumferential direction of the opening 134. Further, the body claws 124, 126, and 128 have the shape of an arc in a case where the body claws 124, 126, and 128 are viewed in the direction of the optical axis OA. The shape of an arc includes an arc shape and a substantially arc shape. The front surface of the body mount ring 130 functions as a body mount-reference surface of the camera body 100.

It is preferable that the body mount ring 130 and the body claws 124, 126, and 128 are integrated with each other. The body mount ring 130 and the body claws 124, 126, and 128 can be formed integrally with each other by, for example, pressing or the like.

An elastic member 154 is provided on the body claw 124 of the body mount 122. As shown in FIG. 3, in this embodiment, the elastic member 154 is disposed on a forward portion of the body claw 124 in a clockwise direction in a case where the elastic member 154 is viewed toward the rear side from the front side in the direction of the optical axis OA.

A case where the elastic member 154 is disposed on the corresponding body claw 124 has been exemplified, but the invention is not limited thereto. The elastic member 154 can be disposed on the extension of the corresponding body claw 124 in the circumferential direction. For example, the elastic member 154 can be disposed in a gap between the body claws 124 and 126 that is the extension of the body claw 124 in the clockwise direction. It is preferable that a distance between the elastic member 154 and the body claw 124 is short. The reason for this is that the bayonet claw 216 (see FIG. 4) of the lens mount 206 passes through the gap between the body claws 124 and 126.

An example where one elastic member 154 is disposed on the body mount 122 has been described in this embodiment, but an elastic member can be disposed on each of the body claws 126 and 128. That is, a plurality of elastic members may be disposed on the body mount 122.

The elastic member 154 comprises a contact surface 154A to be in contact with a cylindrical portion 210 (see FIG. 4) of the lens mount 206. It is preferable that the elastic member 154 protrudes toward the opening 134 (the cylindrical portion 210) more than the body claw 124. The elastic member 154 can be more reliably allowed to be in contact with the cylindrical portion 210 of the lens mount 206.

Since the elastic member 154 is disposed on the body mount 122, feeling and sound, which are generated in a case where the lens unit 200 is mounted on the camera body 100, can be improved. The mounting of the lens unit 200 on the camera body 100 will be described later.

As shown in FIG. 3, the lens attachment/detachment button 112 is disposed on the front side of the camera body 100. A locking pin 132, which can be moved in the front-rear direction in conjunction with an operation for pressing the lens attachment/detachment button 112, is disposed on the body mount ring 130. The lens attachment/detachment button 112 and the locking pin 132 are biased to the front side by biasing means (not shown). Accordingly, the locking pin 132 protrudes through a through-hole of the body mount ring 130 in a state where the lens attachment/detachment button 112 is not pressed. By the operation for pressing the lens attachment/detachment button 112, the locking pin 132 is moved to a position where the locking pin 132 is retracted inside the through-hole from a position where the locking pin 132 protrudes from the body mount ring 130.

A plurality of signal contacts 136 are arranged on a seat 138 of the body mount 122 along the inner periphery of the opening 134 of the body mount ring 130. Each of the signal contacts 136 is formed of, for example, a pin, is biased to the front side of the camera body 100 by biasing means (not shown), and protrudes forward from the seat 138. The signal contacts 136 can be adapted to be capable of being moved in the front-rear direction by biasing means.

Pull springs 144, 146, and 148 are arranged on the body mount 122 at positions corresponding to the rear sides of the body claws 124, 126, and 128 in the direction of the optical axis OA, respectively. In a case where the lens unit 200 is mounted on the camera body 100, the pull springs 144, 146, and 148 bias the bayonet claws 214, 216, and 218 of the lens unit 200 to the rear side in the direction of the optical axis OA. The pull springs 144, 146, and 148 pull the lens unit 200 toward the camera body 100, and allow a lens mount-reference surface and the body mount-reference surface to be in contact with each other. The positions of the image sensor 150 of the camera body 100 and the optical system 202 of the lens unit 200 in the direction of the optical axis OA and an optical distance between the image sensor 150 and the optical system 202 are determined.

In this embodiment, the elastic member 154 is disposed at a position where the elastic member 154 does not interfere with the pull spring 144 in a case where the elastic member 154 is viewed in the direction of the optical axis OA. The reason for this is not to allow the elastic member 154 to affect the biasing force of the pull spring 144.

FIG. 4 is a perspective view showing the appearance of the lens unit 200 that is viewed from the side thereof to be mounted on the camera body 100. As shown in FIG. 4, the lens mount 206 to be mounted on the body mount 122 is comprised on one end side of the lens barrel 204 of the lens unit 200, that is, the rear side of the lens barrel 204. The lens mount 206 has a bayonet structure.

The lens mount 206 comprises a lens mount ring 208, a cylindrical portion 210 that extends rearward from the lens mount ring 208, and the three bayonet claws 214, 216, and 218 that are arranged in the circumferential direction of the cylindrical portion 210 and extend outward in the radial direction of the cylindrical portion 210.

An outer peripheral surface, which forms the cylindrical portion 210 of this embodiment, continues in an arc shape, but is not limited thereto. As long as the cylindrical portion 210 includes a contact portion to be in contact with the elastic member 154, the outer peripheral surface of the cylindrical portion 210 may be an outer peripheral surface that includes a non-continuous portion.

In this embodiment, the cylindrical portion 210 includes a thin-wall portion 210A between the bayonet claws 214 and 216. While the mounting of the lens unit 200 on the camera body 100 is completed, a state where the thin-wall portion 210A and the elastic member 154 are not in contact with each other is made. Since the cylindrical portion 210 is provided with the thin-wall portion 210A that is not to be in contact with the elastic member 154, a position where the elastic member 154 and the cylindrical portion 210 starts to be in contact with each other can be appropriately determined. The thin-wall portion 210A is provided between the adjacent bayonet claws 214 and 216. The reason for this is that the elastic member 154 passes through a gap between the bayonet claws 214 and 216. At least one thin-wall portion 210A has only to be provided on the cylindrical portion 210 in the gap through which the elastic member 154 is to pass, and thin-wall portions do not need to be provided between all the bayonet claws. The thin-wall portion means a portion that is thinner than the cylindrical portion.

The lens mount 206 is provided with the three bayonet claws 214, 216, and 218 in this embodiment, but is not limited thereto. For example, the number of the bayonet claws may be 2 or 4.

In this embodiment, the surface of the lens mount ring 208 exposed from the lens barrel 204 functions as a lens mount-reference surface. In a case where the lens unit 200 is mounted on the camera body 100, the lens mount-reference surface of the lens mount ring 208 and the body mount-reference surface of the body mount ring 130 are in contact with each other.

As shown in FIG. 4, the bayonet claws 214, 216, and 218 are arranged at intervals. The size of the interval between the bayonet claws 214, 216, and 218 is set to a size that can allow each of the body claws 124, 126, and 128 of the body mount 122 to pass.

The lens mount-reference surface of the lens mount ring 208 is provided with a pin hole 212 into which the locking pin 132 of the camera body 100 is to be inserted.

Three bayonet grooves 224, 226, and 228 are defined by the lens mount-reference surface and the respective bayonet claws 214, 216, and 218 of the lens mount 206.

The lens mount 206 includes a mount cover 230 that is fixed to the inner peripheral side of the cylindrical portion 210. A plurality of signal contacts 232 are arranged on a seat 234 provided on the exposed surface that is provided on the rear side of the mount cover 230. In a case where the lens unit 200 is mounted on the camera body 100, the signal contacts 232 of the lens unit 200 and the signal contacts 136 of the camera body 100 are electrically connected to each other.

The mounting of the lens unit 200 (not shown) on the camera body 100 (not shown) will be described with reference to FIGS. 5 to 7. The bayonet claws 214, 216, and 218 of the lens mount 206 are not shown to facilitate the understanding of the operations of the elastic member 154 of the body mount 122 and the cylindrical portion 210 of the lens mount.

Figure 5:
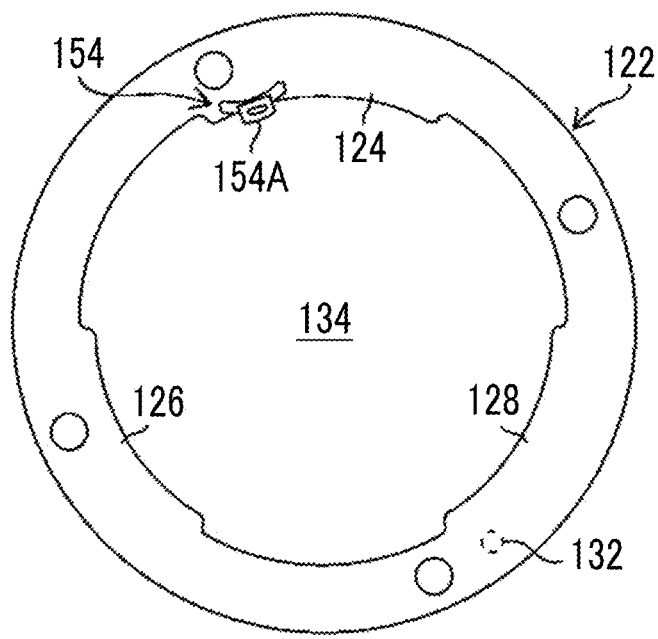
FIG. 5 is a diagram of the body mount viewed from the rear side in the direction of an optical axis.

FIG. 5 is a diagram of the body mount 122 of the camera body 100 viewed toward the front side from the rear side in the direction of the optical axis OA. As shown in FIG. 5, the body claws 124, 126, and 128 are arranged along the inner periphery of the opening 134 of the body mount 122. The elastic member 154 is disposed on the body claw 124 at a position where the contact surface 154A faces the opening 134.

The elastic member 154 is disposed on a forward portion of the body claw 124 in a counterclockwise direction in a case where the elastic member 154 is viewed toward the front side from the rear side in the direction of the optical axis OA. The locking pin 132, which is to be inserted into the pin hole 212 (not shown) of the lens mount 206, is disposed on the body mount 122.

Figure 6:
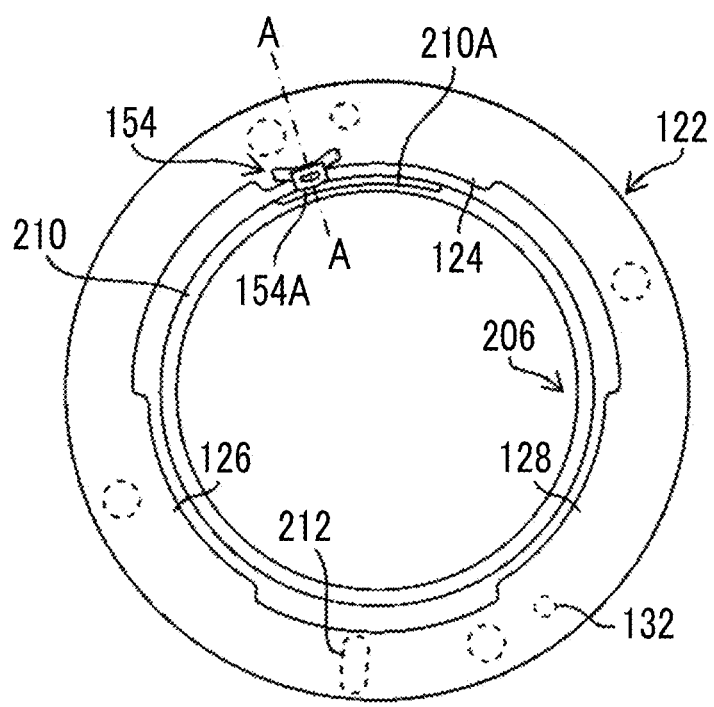
FIG. 6 is a diagram showing a state where a lens mount and the body mount are fitted to each other, viewed from the rear side in the direction of the optical axis.

FIG. 6 is a diagram showing a state where the lens mount and the body mount are fitted to each other, viewed from the rear side in the direction of the optical axis. First, the bayonet claws 214, 216, and 218 (not shown) of the lens mount 206 and the body claws 124, 126, and 128 of the body mount 122 are positioned at positions where the bayonet claws and the body claws do not interfere with each other. The lens unit 200 is fitted to the camera body 100 in this state, and the lens mount-reference surface of the lens mount 206 and the body mount-reference surface of the body mount 122 are in contact with each other.

Since the thin-wall portion 210A is provided on the cylindrical portion 210 as shown in FIG. 6 in this embodiment, a state where the elastic member 154 and the cylindrical portion 210 are not in contact with each other is made. That is, the elastic member 154 and the cylindrical portion 210 are not in contact with each other.

In a state where the lens mount-reference surface and the body mount-reference surface are in contact with each other, the lens unit and the camera body are rotated relative to each other. In a case where the lens mount 206 is rotated in a counterclockwise direction and the body mount 122 is rotated in a clockwise direction in FIG. 6, the cylindrical portion 210 and the elastic member 154 are moved relative to each other. The lens mount 206 is rotated in a counter-clockwise direction in FIG. 6 to facilitate understanding. The lens mount 206 is rotated in a clockwise direction in a case where the lens unit is viewed toward the rear side from the front side in the direction of the optical axis OA.

The bayonet claws 214, 216, and 218 (not shown) are moved to the rear sides of the corresponding body claws 124, 126, and 128, that is, the body claws 124, 126, and 128 are moved to the corresponding bayonet grooves 224, 226, and 228 (not shown). Accordingly, the body claws 124, 126, and 128 and the bayonet claws 214, 216, and 218 start to overlap with each other in a case where the body claws 124, 126, and 128 and the bayonet claws 214, 216, and 218 are viewed in the direction of the optical axis OA.

As shown in FIG. 6, the lens mount 206 is provided with the pin hole 212. The locking pin 132 is not inserted into the pin hole 212 in the state where the lens mount and the body mount are fitted to each other.

Figure 7:
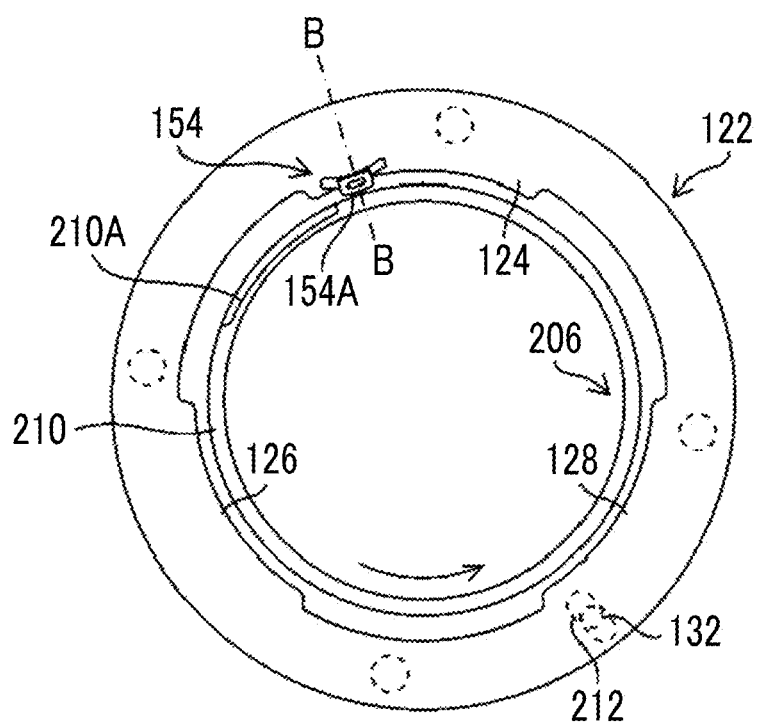
FIG. 7 is a diagram showing a state where the lens mount is mounted on the body mount at a stop position, viewed from the rear side in the direction of the optical axis.

FIG. 7 is a diagram showing a state where the lens mount is mounted on the body mount at a stop position, viewed from the rear side in the direction of the optical axis. After that, the locking pin 132 of the camera body 100 is inserted into the pin hole 212 of the lens unit 200 as shown in FIG. 7 in a case where the lens unit 200 and the camera body 100 are rotated relative to each other. The rotation of the lens unit 200 is locked. Accordingly, the rotation of the lens unit 200 is restricted, so that the separation of the lens unit 200 from the camera body 100 is prevented. Therefore, the lens unit 200 is mounted on the camera body 100. In this specification, a state where the locking pin 132 is inserted into the pin hole 212 is defined as a "stop position".

Engagement between the body claws 124, 126, and 128 and the bayonet claws 214, 216, and 218 means a state where the bayonet claws 214, 216, and 218 and the corresponding body claws 124, 126, and 128 overlap with each other in a case where the camera system 1 is viewed in the direction of the optical axis OA. The bayonet claws 214, 216, and 218 and the corresponding body claws 124, 126, and 128 may partially overlap with each other.

As shown in FIG. 7, the contact surface 154A of the elastic member 154 is in contact with the cylindrical portion 210 at the stop position. The elastic member 154 is elastically deformed in a case where the elastic member 154 is in contact with the cylindrical portion 210. As a result, the elastic member 154 biases the corresponding cylindrical portion 210 inward in the radial direction. The radial direction is a direction orthogonal to the optical axis OA, is a radial direction having a center on the optical axis OA, and is also referred to as a radial direction. Orthogonal includes orthogonal and substantially orthogonal, and the center includes a center and a substantial center.

In this embodiment, the elastic member 154 is disposed at the position of the rear end of the body claw 124 in a travel direction of the relative movement of the body claw 124 and the bayonet claw 214. Since the elastic member 154 is disposed at the position of the rear end of the body claw 124, the elastic member 154 and the cylindrical portion 210 start to be into contact with each other at a position immediately before the body claw 124 reaches the stop position. That is, this means that the elastic member 154 and the cylindrical portion 210 are not in contact with each other until the elastic member 154 and the cylindrical portion 210 reach the stop position. The position of the rear end of the body claw 124 means the rear side of the body claw 124 in the travel direction, and does not mean only the rear end of the body claw 124 and also includes the extension direction thereof.

Here, as long as the elastic member 154 can be in contact with the cylindrical portion 210, the position of the elastic member 154 is not limited.

As described above, the elastic member 154 and the cylindrical portion 210 start to be in contact with each other immediately before the mounting of the lens unit 200 on the camera body 100 is completed. According to the camera system of this embodiment, since the amount of torque, which is required in a case where the lens unit 200 is to be rotated, can be adjusted by the biasing force of the elastic member 154 unlike in camera body not including the elastic member, good feeling and sound can be given to an operator.

A position where the elastic member 154 and the cylindrical portion 210 start to be in contact with each other can be changed by a change in the position of the elastic member 154 that is disposed on the body mount 122 or a change in the length or position of the thin-wall portion 210A of the cylindrical portion 210.

Further, backlash in the radial direction, which occurs between the lens unit 200 and the camera body 100, can be reduced by the elastic member 154. Furthermore, sound caused by backlash in the radial direction can be reduced.

Since the elastic member 154 biases the cylindrical portion 210 in the radial direction even after the lens unit 200 is mounted on the camera body 100, good feeling and a reduction in sound can be given to an operator even during the operation of the lens unit 200.

In addition, feeling can be changed according to operator's preference by a change in the material and/or shape of the elastic member 154.

Figure 8:
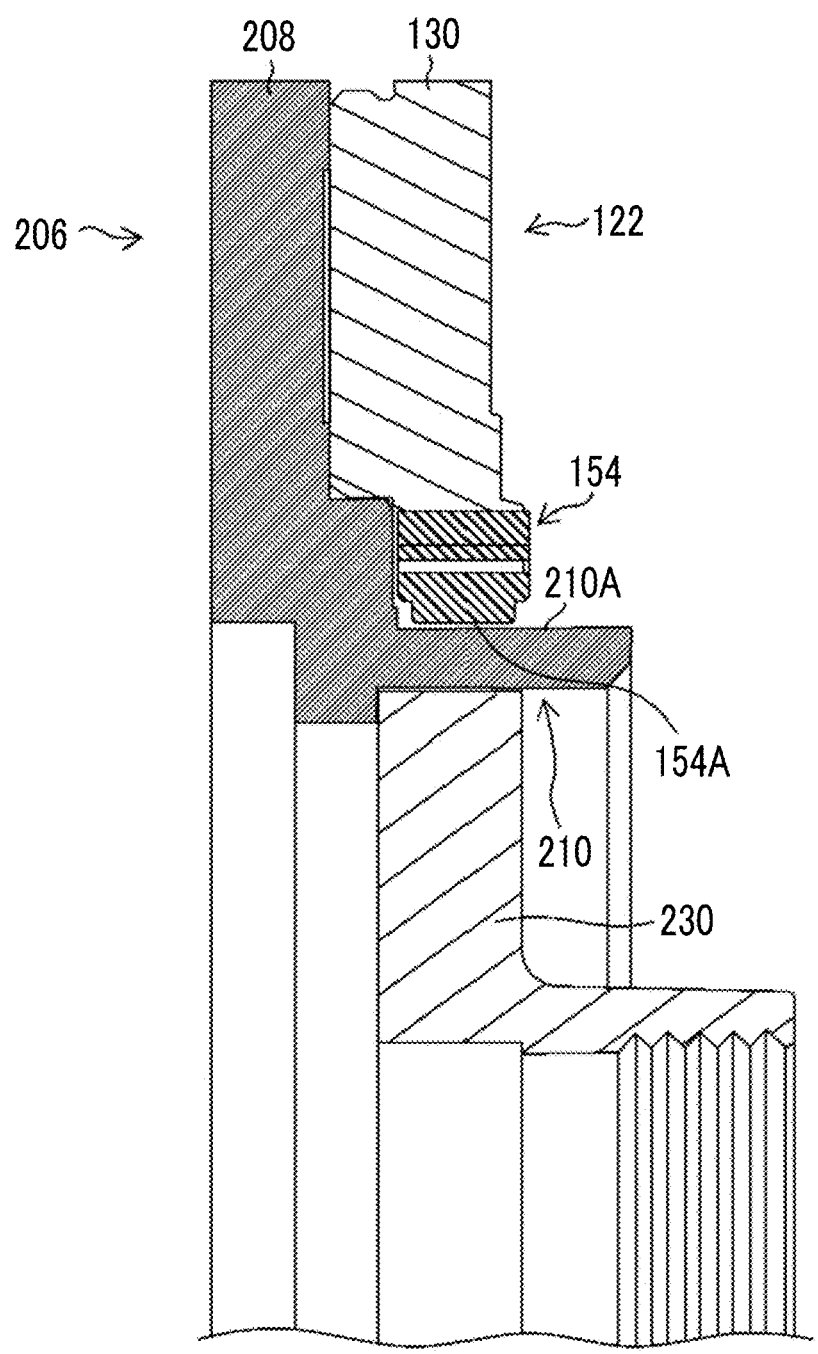
FIG. 8 is a cross-sectional view taken along line A-A of FIG. 6.
Figure 9:
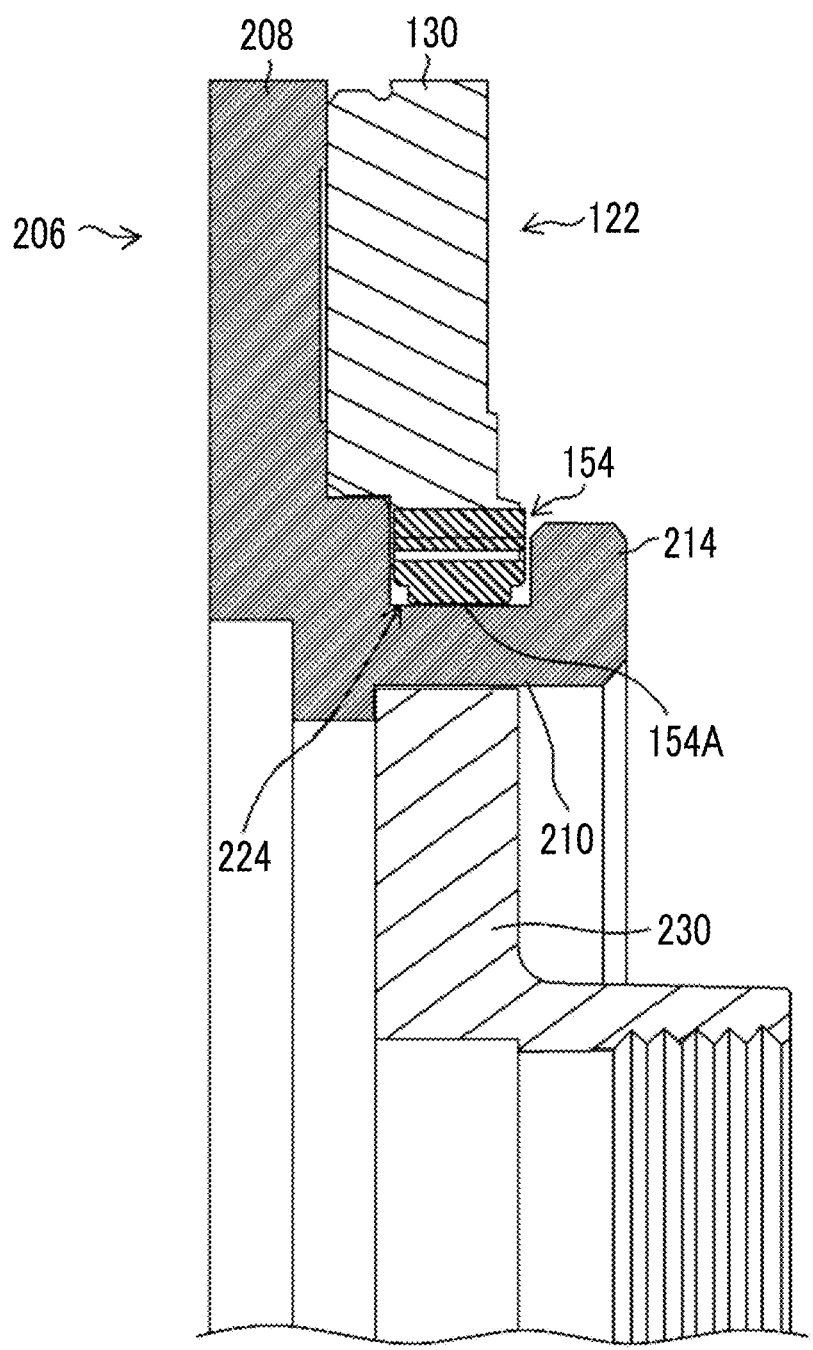
FIG. 9 is a cross-sectional view taken along line B-B of FIG. 7.

A positional relationship between the elastic member and the cylindrical portion in the state where the lens mount and the body mount are fitted to each other and the state where the lens mount is mounted on the body mount will be described. FIG. 8 is a cross-sectional view taken along line A-A of FIG. 6, and FIG. 9 is a cross-sectional view taken along line B-B of FIG. 7. FIG. 8 is a cross-sectional view of the lens mount 206 and the body mount 122 viewed in a direction orthogonal to the optical axis OA. The lens mount-reference surface of the lens mount ring 208 and the body mount-reference surface of the body mount ring 130 are in contact with each other.

The elastic member 154 protrudes toward the cylindrical portion 210 from the body mount ring 130. Since the elastic member 154 and the thin-wall portion 210A are provided at a position where the elastic member 154 and the thin-wall portion 210A face each other, the contact surface 154A of the elastic member 154 and the cylindrical portion 210 are not in contact with each other. The elastic member 154 is supported by the body mount ring 130.

FIG. 9 is a cross-sectional view of the lens mount 206 and the body mount 122 viewed in a direction orthogonal to the optical axis OA. As shown in FIG. 9, the elastic member 154 is positioned in the bayonet groove 224 that is formed by the bayonet claw 214, the cylindrical portion 210, and the lens mount-reference surface. The contact surface 154A of the elastic member 154 and the cylindrical portion 210 are in contact with each other. Accordingly, the elastic member 154 biases the cylindrical portion 210 in the radial direction.

Figure 10:
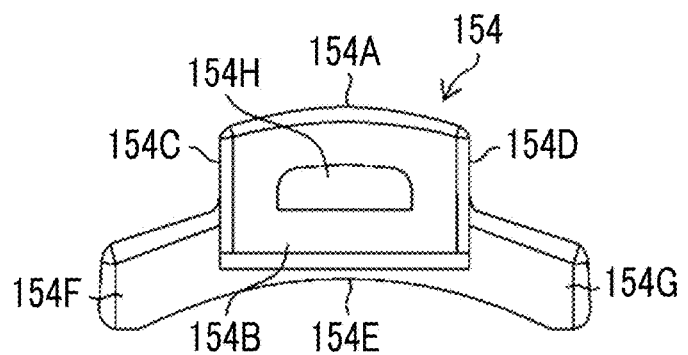
FIG. 10 is a front view of an elastic member.

Next, the shape of the elastic member will be described with reference to the drawings. FIG. 10 is a front view of the elastic member, and FIG. 11 is a perspective view of the elastic member.

Figure 11:
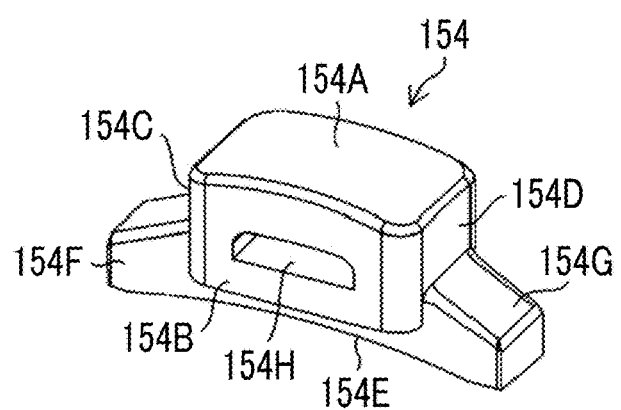
FIG. 11 is a perspective view of the elastic member.

As shown in FIGS. 10 and 11, the elastic member 154 comprises a body portion 154B that has the shape of a substantially rectangular parallelepiped as a whole. The body portion 154B comprises a contact surface 154A that is to be in contact with the cylindrical portion 210 (not shown). Protruding portions 154F and 154G, which continue from an opposite surface 154E opposite to the contact surface 154A, are provided on side surfaces 154C and 154D of the body portion 154B in a longitudinal direction, respectively. The opposite surface 154E means a surface that faces the contact surface 154A.

The elastic member 154 of this embodiment has a hollow structure where a hollow portion 154H is formed in the body portion 154B. The hollow portion 154H passes through the body portion 154B. In a front view, the side of the hollow portion 154H close to the contact surface 154A has the shape of an arc and the side of the hollow portion 154H close to the opposite surface 154E has a linear shape. Further, connecting portions between the sides of the hollow portion 154H close to the side surfaces 154C and 154D and the side of the hollow portion 154H close to the contact surface 154A have the shape of an arc. Furthermore, connecting portions between the sides of the hollow portion 154H close to the side surfaces 154C and 154D and the side of the hollow portion 154H close to the opposite surface 154E have the shape of a right angle. Here, the shape of an arc includes the shape of an arc and the shape of a substantial arc, the linear shape includes a line and a substantial line, and the shape of a right angle includes the shape of a right angle and the shape of a substantially right angle.

In the elastic member 154 of this embodiment, the contact surface 154A has the shape of an arc that protrudes toward the cylindrical portion 210 (not shown). The shape of an arc includes the shape of an arc and the shape of a substantial arc. The shape of a substantial arc is a shape where a distance from the opposite surface 154E is increased toward the middle portion of the contact surface 154A from the side surfaces 154C and 154D. A shape toward the middle portion of the contact surface 154A from the side surfaces 154C and 154D may be a curved shape or a linear shape.

In the elastic member 154 of this embodiment, the opposite surface 154E has the shape of an arc that protrudes toward the contact surface 154A. Further, the opposite surface 154E and the protruding portions 154F and 154G are continuous and form the shape of an arc. A surface (back surface) where the opposite surface 154E and the protruding portions 154F and 154G are continuous is supported by the body mount ring 130.

In this embodiment, the curvature of the arc shape of the contact surface 154A is smaller in a case where the curvature of the arc shape of the contact surface 154A and the curvature of an arc shape, which is formed by the opposite surface 154E and the protruding portions 154F and 154G, are compared with each other. The elastic member 154 including the hollow portion 154H has been described in this embodiment, but an elastic member not including the hollow portion can be used.

It is preferable that the above-mentioned elastic member is formed of a molded member and is adapted to generate an elastic force by the entire elastic member. The fact that the elastic member is formed of a molded member means that the elastic member is an object manufactured by molding. Molding is a method including heating a material, such as rubber or a resin, to a high temperature, filling a mold or the like with the material, and solidifying the material with cooling, a polymerization reaction, and the like. Examples of the material include rubber, such as silicone rubber and elastomer, and a resin. Since the elastic member is formed of a molded member, the elastic member can be manufactured at a relatively low cost. Since the elastic member is formed of a molded member, an elastic force can be generated by the entire elastic member. Accordingly, a stable biasing force can be applied to the cylindrical portion of the lens mount.

Next, the deformation of the elastic member and the elastic force generated by the entire elastic member will be described with reference to FIGS. 12 to 16I.

Figure 12:
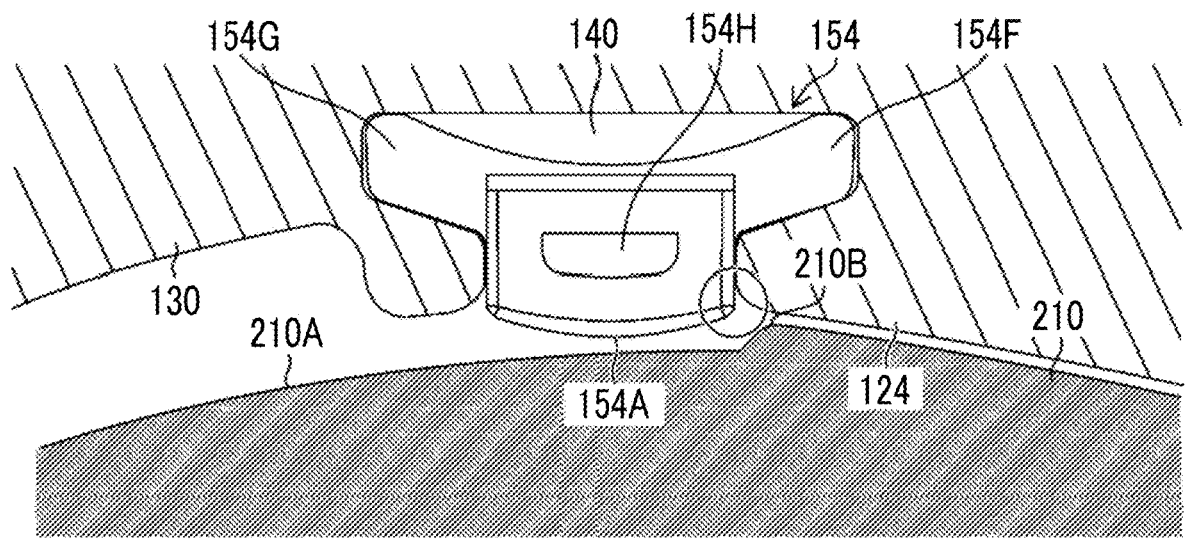
FIG. 12 is a diagram showing a state immediately before the elastic member and a cylindrical portion start to be in contact with each other.

FIG. 12 is a diagram showing a state immediately before the elastic member and the cylindrical portion start to be in contact with each other. In this embodiment, the elastic member 154 is fitted to a fitting groove 140 that is carved in the body claw 124 by milling or the like as shown in FIG. 12. However, the invention is not limited to a case where the fitting groove 140 is formed in the body claw 124, and the fitting groove 140 may be formed in the body mount ring 130.

It is preferable that the shape of the front end (a portion surrounded by a circle) of the contact surface 154A of the elastic member 154 in the travel direction is the shape of a rounded corner. The shape of a rounded corner is not limited to a case where the front end of the contact surface 154A is formed of a rounded surface shown in the drawing, and includes not only a case where the front end of the contact surface 154A is formed of a chamfer (for example, an angular surface having a predetermined angle (for example, 45°)) but also a case where the front end of the contact surface 154A is formed of a polygonal surface.

Further, it is preferable that a step 210B between the cylindrical portion 210 and the thin-wall portion 210A also has the shape of a rounded corner.

Since the elastic member 154 and the step 210B of the cylindrical portion 210 have the shape of a rounded corner, the scrape of the elastic member 154 caused by the step 210B can be suppressed in a region where the elastic member and the cylindrical portion start to be in contact with each other.

Further, the movement of the elastic member 154 in the lateral direction can be suppressed by the step 210B of the cylindrical portion 210. In a case where the elastic member 154 is moved in the lateral direction, the elastic member 154 tends to return to the original position. As a result, there is a case where the durability of the elastic member 154 is affected by stress that is caused by the return of the elastic member 154. Accordingly, it is preferable that the movement of the elastic member 154 in the lateral direction is suppressed. Furthermore, the separation of the elastic member 154 from the fitting groove 140 can be suppressed in a case where the movement of the elastic member 154 in the lateral direction is suppressed.

Further, in this embodiment, preferably, a contact angle between the elastic member 154 and the step 210B is set to an angle that allows the step 210B to ride on the contact surface 154A after the contact between the elastic member 154 and the step 210B. Since the step 210B rides on the contact surface 154A, the scrape of the elastic member 154, the movement of the elastic member 154 in the lateral direction, and the separation of the elastic member 154 from the fitting groove 140 can be suppressed. The contact angle is an angle that is formed between a tangent at a contact point between the elastic member 154 and the step 210B of the cylindrical portion 210 and the side surface of the elastic member 154.

Figure 13:
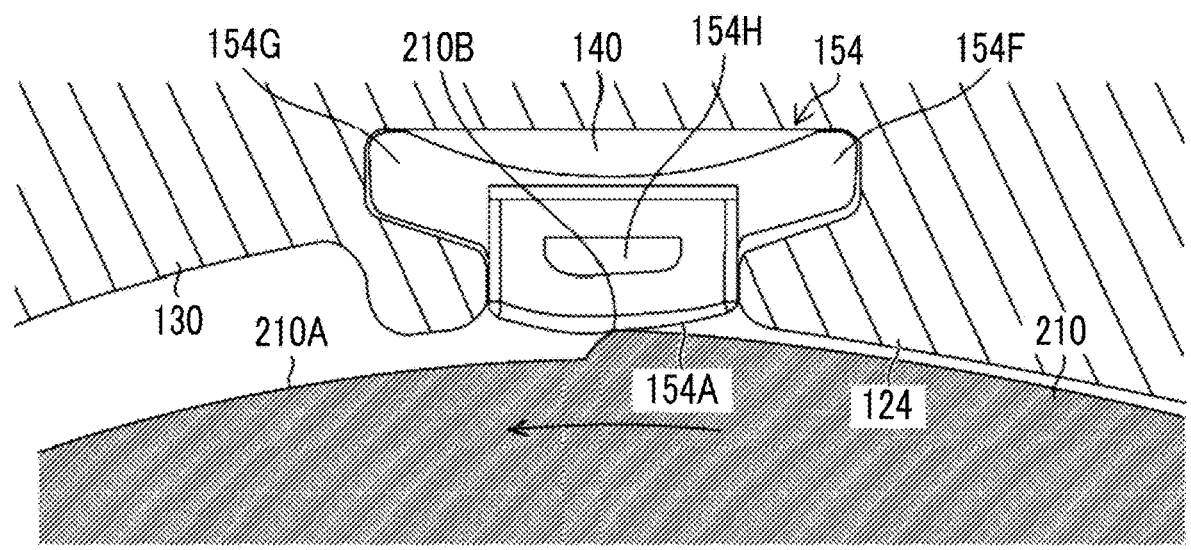
FIG. 13 is a diagram showing a state where the elastic member and the cylindrical portion, which do not yet reach the stop position, are in contact with each other.

FIG. 13 shows a state where the elastic member 154 of this aspect and the cylindrical portion 210, which do not yet reach the stop position, are in contact with each other. In a case where the elastic member 154 and the cylindrical portion 210 are in contact with each other as shown in FIG. 13, the elastic member 154 is deformed since the stiffness of the cylindrical portion 210 is higher than the stiffness of the elastic member 154. Since the elastic member 154 includes the hollow portion 154H, the hollow portion 154H is also deformed. In addition, since the protruding portions 154F and 154G of the elastic member 154 have the shape of an arc, the protruding portions 154F and 154G are deformed and bent as a whole.

Figure 14:
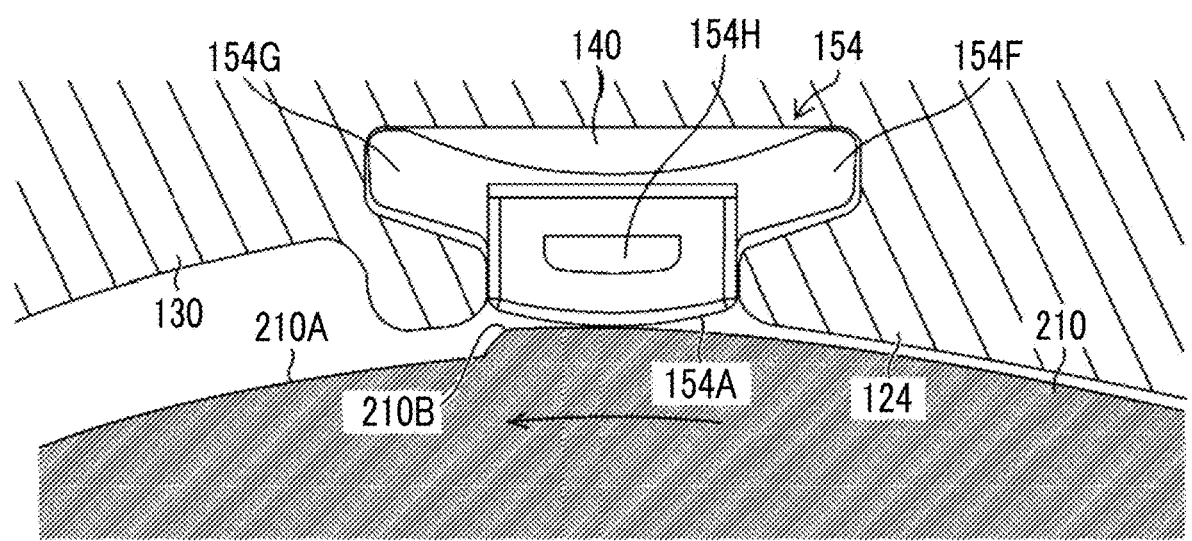
FIG. 14 is a diagram showing a state where the elastic member and the cylindrical portion are in contact with each other at the stop position.

FIG. 14 is a diagram showing a state where the elastic member 154 and the cylindrical portion 210 are in contact with each other at the stop position. In a case where the elastic member 154 and the cylindrical portion 210 are in contact with each other as shown in FIG. 14, the elastic member 154 is deformed, the hollow portion 154H is deformed, and the protruding portions 154F and 154G are deformed and bent as a whole.

Accordingly, biasing forces caused by the deformation of the elastic member 154, the deformation of the hollow portion 154H, and the deformation of the protruding portions 154F and 154G are applied to the cylindrical portion 210. That is, it can be understood that the entire elastic member 154 generates an elastic force.

Since the contact surface 154A of the elastic member 154 has the shape of an arc protruding toward the cylindrical portion 210, the contact surface 154A is evenly worn by the cylindrical portion 210. The durability of the elastic member 154 can be improved more than that in a case where the contact surface 154A is unevenly worn.

FIGS. 15A to 15I are diagrams showing the distribution of resultant displacement and the distribution of stress of the elastic member, which is shown in FIGS. 12 to 14, based on the result of a simulation (at the time when the elastic member and the cylindrical portion starts to be in contact with each other). The simulation is performed while appropriate conditions are selected in regard to a load, a mesh size, a displacement scale, and the like.

FIGS. 15A to 15I show a state where the cylindrical portion starts to be in contact with the contact surface of the elastic member. FIG. 15A is a perspective view of the elastic member viewed from one side. FIG. 15B is a front view of the elastic member. FIG. 15C is a back view of the elastic member. FIG. 15D is a right side view of the elastic member. FIG. 15E is a left side view of the elastic member. FIG. 15F is a perspective view of the elastic member viewed from the side opposite to one side. FIG. 15G is a plan view of the elastic member. FIG. 15H is a bottom view of the elastic member. FIG. 15I is a stress distribution diagram of the elastic member.

FIGS. 15A to 15I show the result of the simulation with binarized data. However, the magnitude of displacement is actually displayed with colors. Displacement is increased in the order of blue (BL), light blue (LB), green (G), yellow green (YG), yellow (Y), orange (OR), and red (R). The magnitude of displacement will be described with reference to FIGS. 15A to 15I. Representative colors are shown in FIGS. 15A to 16I.

As shown in FIG. 15A, the protruding portion of the elastic member positioned on the near side is blue and light blue. The contact surface of the elastic member shows green, yellow, orange, yellow, green, light blue, and blue toward the back side from the near side along the contact surface. An orange portion does not appear in the middle of the contact surface, and is positioned on the near side.

In the front view of FIG. 15B, the contact surface of the elastic member shows light blue, green, yellow, orange, yellow, green, light blue, and blue toward the right from the left along the contact surface. In the back view of FIG. 15C, the contact surface of the elastic member shows light blue, green, yellow, orange, yellow, green, light blue, and blue toward the left from the right along the contact surface. In FIG. 15B, a portion, which is close to the opposite surface, of a region, which corresponds to the orange of the contact surface, shows light green.

The positions of the colors shown in FIG. 15C are symmetric to the positions of the colors shown in FIG. 15B. In FIG. 15D, the right side surface shows blue as a whole. It can be understood that a portion close to the right side surface is hardly displaced. In FIG. 15E, the middle portion of the left side surface shows green. In FIG. 15F, the contact surface of the elastic member shows the same colors as FIG. 15A toward the back side from the near side. FIG. 15G is a plan view of FIG. 15C, and shows the same colors as FIG. 15C. FIG. 15H is a plan view of FIG. 15C, and shows blue, light blue, green, and light blue toward the right from the left. In the stress distribution diagram of FIG. 15I, a region of which the amount of displacement is large shows green. It can be understood that stress is distributed over the contact surface.

As shown in FIGS. 15A to 15I, it can be understood that the amount of displacement of the elastic member is increased at a position where the elastic member and the cylindrical portion are in contact with each other until the elastic member and the cylindrical portion reach the stop position from the start of the contact between the elastic member and the cylindrical portion. According to FIG. 15I, local stress distribution appears on the contact surface of the elastic member but local stress distribution does not appear on a portion other than the contact surface of the elastic member. That is, it can be presumed that the entire elastic member is displaced due to a force applied from the cylindrical portion.

Figure 16A:
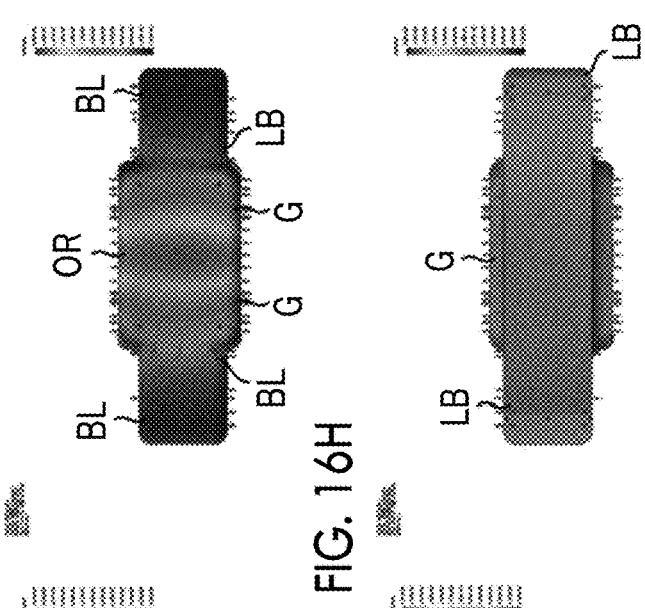
FIGS. 16A to 16I are diagrams showing the distribution of displacement and stress of the elastic member.
Figure 16B:
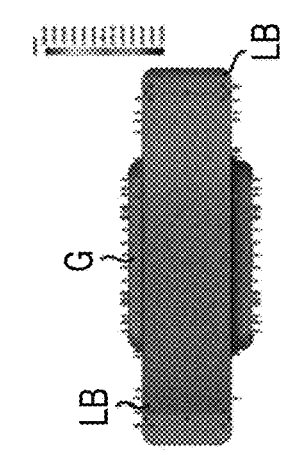
Figure 16C:
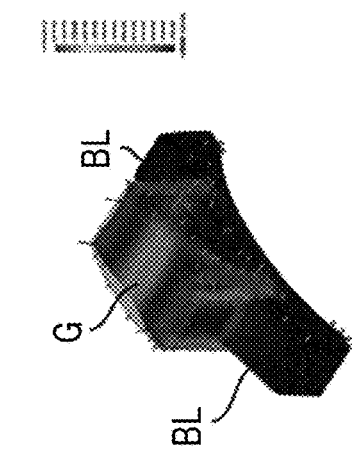
Figure 16D:
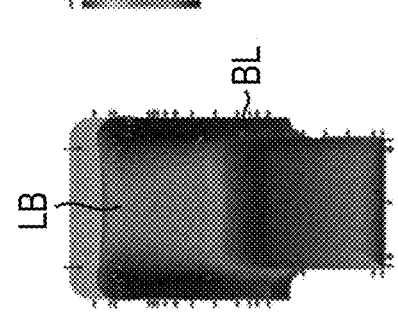
Figure 16E:
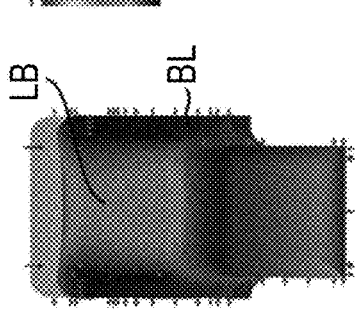
Figure 16F:
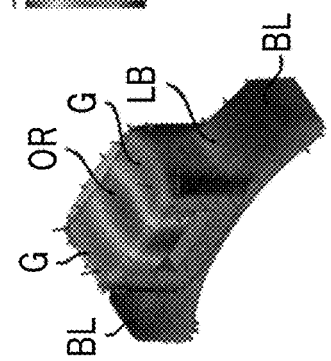
Figure 16G:
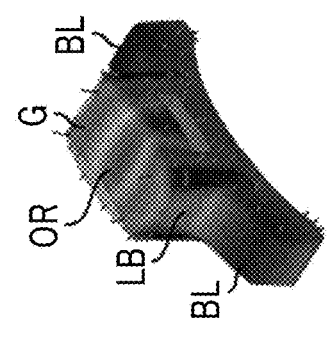
Figure 16H:
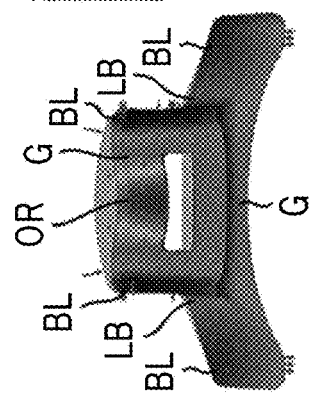
Figure 16I:
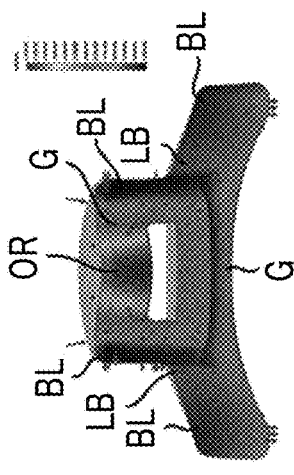

FIGS. 16A to 16I are diagrams showing the resultant displacement and the distribution of stress of the elastic member, which is shown in FIGS. 12 to 14, based on the result of a simulation (after the elastic member and the cylindrical portion are in contact with each other or when the elastic member and the cylindrical portion reach the stop position). FIG. 16A is a perspective view of the elastic member viewed from one side. FIG. 16B is a front view of the elastic member. FIG. 16C is a back view of the elastic member. FIG. 16D is a right side view of the elastic member. FIG. 16E is a left side view of the elastic member. FIG. 16F is a perspective view of the elastic member viewed from the side opposite to one side. FIG. 16G is a plan view of the elastic member. FIG. 16H is a bottom view of the elastic member. FIG. 16I is a stress distribution diagram of the elastic member.

As shown in FIG. 16A, the protruding portion of the elastic member positioned on the near side is blue and light blue. The contact surface of the elastic member shows green, yellow, orange, yellow, green, light blue, and blue toward the back side from the near side along the contact surface. An orange portion is positioned in the middle of the contact surface. In the front view of FIG. 16B, the contact surface of the elastic member shows blue, light blue, green, yellow, orange, yellow, green, light blue, and blue toward the right from the left along the contact surface. The positions of the colors shown in FIG. 16C are symmetric to the positions of the colors shown in FIG. 16B.

In FIGS. 16D and 16E, a middle region of the side surface shows light blue and the protruding portion shows blue. It can be understood that the amount of displacement of the right side surface is substantially equal to the amount of displacement of the left side surface. FIG. 16F shows the same colors as FIG. 16A toward the back side from the near side. In FIG. 16G, the protruding portions show blue and light blue and the contact surface shows green, yellow, orange, yellow, and green toward the right from the left. In FIG. 16H, the back surfaces of the protruding portions show light blue and the back surface of the contact surface shows green.

FIG. 16I shows the distribution of stress of the elastic member at the stop position. As shown in FIG. 16I, a region of which the amount of displacement is large shows green. It can be understood that stress is distributed over the contact surface. On the other hand, local stress distribution does not appear on a portion other than the contact surface. Stress, which is caused by the deformation of the elastic member occurring due to the contact between the cylindrical portion and the elastic member, is dispersed over the entire elastic member. Accordingly, since static stress to be applied to the elastic member can be equalized, the durability of the elastic member can be improved.

EXPLANATION OF REFERENCES

1: camera system
100: camera body
102: shutter button
104: exposure correction dial
106: shutter speed dial
108: focus mode switching lever
110: finder switching lever
112: lens attachment/detachment button
114: power lever
116: hot shoe
118: electronic view finder
120: grip
122: body mount
124, 126, 128: body claw
130: body mount ring
132: locking pin
134: opening
136: signal contact
138: seat
140: fitting groove
144, 146, 148: pull spring
150: image sensor
154: elastic member
154A: contact surface
154B: body portion
154C, 154D: side surface
154E: opposite surface
154F, 154G: protruding portion
154H: hollow portion
200: lens unit
202: optical system
204: lens barrel
206: lens mount
208: lens mount ring
210: cylindrical portion
210A: thin-wall portion
210B: step
212: pin hole
214, 216, 218: bayonet claw
224, 226, 228: bayonet groove
230: mount cover
232: signal contact
234: seat
OA: optical axis

What is claimed is:

1. A camera system comprising:
a lens unit that includes a lens mount; and
a camera body that includes a body mount,
wherein the lens mount includes a lens mount-reference surface that is to be in contact with the body mount, a cylindrical portion that extends toward the body mount from the lens mount-reference surface, and a plurality of bayonet claws that are provided in a circumferential direction of the cylindrical portion and extend outward in a radial direction,
the body mount includes a body mount-reference surface that is to be in contact with the lens mount-reference surface, a body claw that is to be engaged with the bayonet claws, and an elastic member that has a contact surface to be in contact with the cylindrical portion, and
the elastic member biases the cylindrical portion in the radial direction in a case where the lens unit is mounted on the body mount.

2. The camera system according to claim 1,
wherein the elastic member is disposed at a position where the elastic member is in contact with the cylindrical portion at a stop position of the body claw.

3. The camera system according to claim 1,
wherein the elastic member is formed of a molded member and is adapted to generate an elastic force by the entire elastic member.

4. The camera system according to claim 1,
wherein the cylindrical portion includes a thin-wall portion that is not in contact with the elastic member.

5. The camera system according to claim 1,
wherein a plurality of the elastic members are arranged.

6. The camera system according to claim 1,
wherein the elastic member is disposed on the body claw or an extension of the body claw in a circumferential direction.

7. The camera system according to claim 1,
wherein the body mount comprises pull springs that bias the bayonet claws in a direction of an optical axis, and
the elastic member is disposed at a position where the elastic member does not interfere with the pull spring in a case where the elastic member is viewed in the direction of the optical axis.

8. The camera system according to claim 1,
wherein the elastic member has a hollow structure.

9. The camera system according to claim 1,
wherein the contact surface of the elastic member protrudes toward the cylindrical portion more than the body claw.

10. The camera system according to claim 1,
wherein the contact surface of the elastic member has the shape of an arc.

11. The camera system according to claim 10,
wherein a surface of the elastic member opposite to the contact surface has the shape of an arc protruding toward the contact surface.

12. The camera system according to claim 1,
wherein a front end of the contact surface of the elastic member in a travel direction has the shape of a rounded corner.

13. A camera body comprising:
a body mount that is to be mounted on a lens mount of a lens unit,
wherein the body mount includes a body mount-reference surface that is to be in contact with the lens mount, a body claw, and an elastic member that is to be in contact with an outer peripheral surface of a cylindrical portion of the lens mount and is to bias the cylindrical portion in a radial direction.

14. The camera body according to claim 13,
wherein the elastic member is disposed on a forward portion of the body claw in a case where the elastic member is viewed toward a rear side from a front side in a direction of an optical axis.

15. The camera body according to claim 13,
wherein the elastic member is disposed on an extension of the body claw in a circumferential direction.

16. The camera body according to claim 13,
wherein the elastic member is disposed protruding towards an opening of a body mount ring of the camera body.

* * * * *